Figure 1:
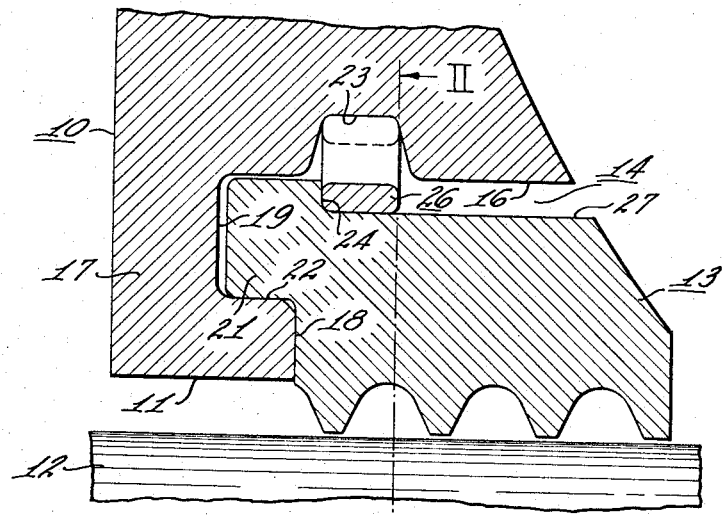

April 9, 1968     T. R. FELLER     3,377,075
ROTATING SHAFT SEAL RETAINER
Filed Jan. 19, 1966

Inventor
Thomas R. Feller
By John P. Hines
Attorney

United States Patent Office 3,377,075
Patented Apr. 9, 1968

3,377,075
ROTATING SHAFT SEAL RETAINER
Thomas R. Feller, Milwaukee, Wis., assignor to Allis-Chalmers Manufacturing Company, Milwaukee, Wis.
Filed Jan. 19, 1966, Ser. No. 521,664
4 Claims. (Cl. 277—149)

This invention relates to seals utilized between a rotating shaft and a stationary housing and more particularly to a novel means for retaining the shaft seal in the housing.

The invention is particularly applicable to that type of seal wherein the sealing is effected along an axially extending surface between the surface of the rotating shaft and stationary seal element. It should be understood however that the invention could be utilized wherein the sealing is effected along a radially extending surface between a shoulder on the shaft and the sealing element. When sealing along an axially extending surface, it is necessary to maintain the seal element against axial movement and also to exert some radial pressure on the seal to ensure contact is maintained between the seal element and the shaft or at least that the prescribed restricted passageway is maintained. It is quite common to provide a shoulder on the seal housing to restrict axial movement of the seal element. However, in some cases there is not sufficient space for these shoulders, or problems of assembly require that the sealing element be inserted on the shaft after its passage through the seal housing. If it is impossible to utilize the shoulders on the housing, a snap ring may be employed to hold the seal element against axial movement. The snap ring is sprung into a groove on the shaft or in the housing so that the end of the seal element in the direction of which it is desired to resist axial movement contacts the snap ring. In either case, with a shoulder or a snap ring provided to resist axial movement, additional springs of one form or another are required to exert the radial pressure on the seal. Furthermore, when compared with applicant's invention, snap rings are more expensive and in certain instances where space limitations are quite critical it becomes quite difficult to assemble the seal.

It is therefore the general object of the invention to provide an inexpensive and easily applied retaining means to resist axial movement of a shaft seal element.

A further object of the subject invention it to provide a shaft seal retaining means of the hereinbefore described type wherein the retaining means also exerts a radial pressure on the sealing element.

Another object of the subject invention is to provide a shaft seal retaining means which can be easily inserted after the sealing element is placed in its operative position about the shaft.

An additional object of the subject invention is to provide a shaft seal retaining means which is composed of one or more straight spring steel leafs which can be snapped into position to both retain the seal element against axial movement and also exert a radial pressure on the seal element.

Figure 2:
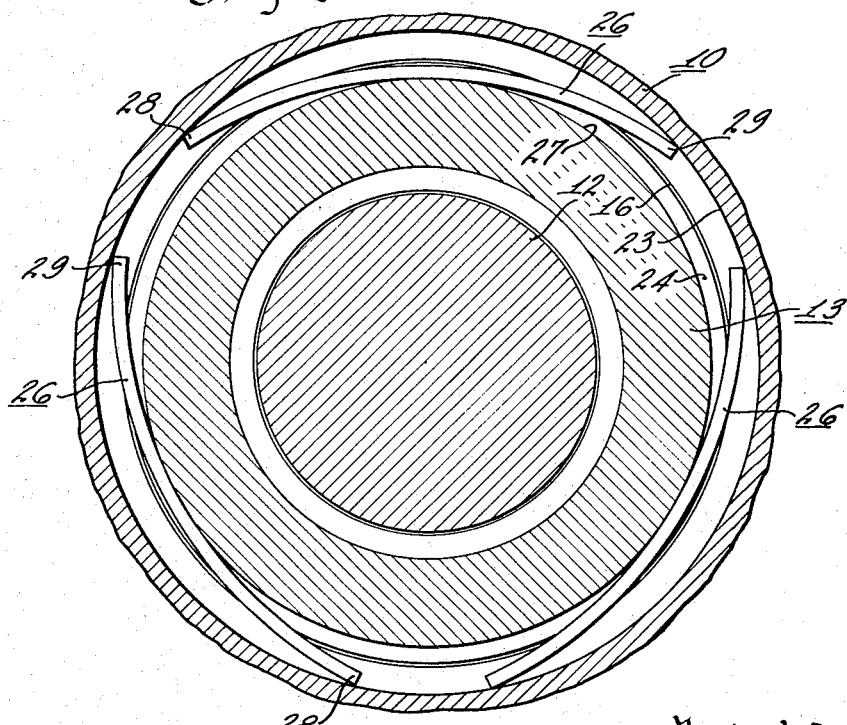

These and other objects of the subject invention will become more fully apparent as the following description is read in light of the attached drawing, wherein:

FIG. 1 is a partial cross section through a seal assembly showing a preferred embodiment of the novel retaining means of this invention in an operative position; and FIG. 2 is a cross section taken along the lines II—II of FIG. 1.

Referring to the drawing, item 10 indicates generally a seal housing having a bore 11 therethrough. A shaft generally designated 12 passes through the housing bore and is supported for rotation by means of conventional shaft bearings (not shown). A sealing element 13 is provided in an annular chamber 14 provided about the shaft and defined by an inner wall 16 of the seal housing 10. One end of this chamber 14 is closed by an end wall 17 of the housing extending to the bore 11. A shoulder on the end wall 17 provides a substantially radially extending face 18 against which one end of the seal element rests. This surface 18 not only provides a sealing contact with the seal element but also holds the seal element against axial movement in one direction. The seal element may be a solid ring or it may be composed of two or more segments depending on the particular application. Furthermore, the sealing face of the seal element may be in the form of a labyrinth seal as herein shown for purposes of illustration, or a solid sealing surface may be employed.

The end wall 17 of the seal housing may also be provided with an annular groove 19 to receive an annular projection 21 of the seal element. The projection 21 and annular groove 19 present complementary surfaces along the line 22 to locate the seal element relative to the shaft 12. Although the seal herein shown for purposes of illustration is a clearance seal, it should be understood that a surface contact seal could also be employed.

In many cases it is not possible to provide a complementary end wall of the housing on the opposite side of the seal element from the end wall 17 to thereby retain the seal against axial movement in the opposite direction. It is therefore necessary to provide some additional means for holding the seal element 13 against axial movement in this opposite direction. To this end and for purposes of illustrating a preferred embodiment of the subject invention, applicant provides an annular groove 23 in the inner peripheral surface of the housing about the annular chamber 14. Furthermore, the seal element 13 is provided with a substantially radially directed annular face 24 in substantial alignment with the groove 23. One or more leaf springs 26 are then snapped into the groove 23 with the center portion of the leaf springs contacting the surface 27 of the seal element 13. This arrangement effectively holds the seal element against axial movement in the said opposite direction as well as providing a radially directed force on the seal element.

From the above it can be seen that applicant has provided an extremely inexpensive simplified means for retaining a seal element in the seal housing. Individual snap rings of exact diameter are not required and it is only necessary that sufficient straight stock of spring steel be kept on hand. Individual segments of whatever length is required are cut from the spring steel stock in order to obtain the proper leaf spring. Each leaf spring can then be bent to conform substantially to the diameter of the sealing element and pushed into alignment with the groove 23 whereby the ends 28 and 29 snap into the groove with the center portion contacting the outer surface 27 of the seal element 13 and also the radial surface 24. Furthermore, in most instances the leaf spring lengths are cut from the leaf spring stock thereby leaving sharp edges at the ends of each individual leaf spring. These edges have a tendency to gouge or dig into the bottom surface of the groove 23 thereby holding themselves in the proper position. Once in place, the side faces of the leaf spring hold the seal element against axial movement in the said opposite direction and furthermore because of the contact at the center of the leaf spring with the outer surface of the seal element the seal element is biased in a radial direction so as to maintain its proper sealing relationship relative to the shaft. Furthermore, should there be relative degrees of expansion of the seal and the seal housing the leaf springs will accommodate this relative movement and still maintain the seal in its proper position.

It should be understood that while only one embodiment of the subject invention has been herein shown and described, modifications thereof will become apparent to those skilled in the art after they have read this description, and it is intended that all such modifications as come within a reasonable interpretation of the appended claims be covered.

The embodiments of the invention in which an exclusive property or privilege is claimed are defined as follows:

1. A shaft seal comprising: a housing having a bore therethrough; a shaft extending through said bore; walls of said housing defining an annular chamber about said shaft; a seal element positioned in said chamber in sealing association with said shaft; first means on said seal element presenting a substantially radially extending surface; second means on said housing presenting a substantially radially extending surface, said first and second means being in substantial alignment; and a leaf spring retainer engaging the substantially radially extending surfaces of both said first and second means, said leaf spring being of sufficient length to require bending thereof for insertion between said seal element and said housing whereby the ends of said leaf spring engage said second means and the center portion of said leaf spring engages said first means to hold said seal element against axial movement.

2. The shaft seal set forth in claim 1 wherein one end of said chamber is open to the exterior of said housing and the other end is closed by a radially extending side wall of said housing, there being sufficient annular space between said housing and said seal element to force said leaf spring therebetween into engagement with said first and second means, said side wall engaging one end of said seal element to hold same against axial movement in one direction, said leaf spring holding said seal element against axial movement in a direction opposite to said one direction.

3. The shaft seal set forth in claim 2 wherein said radially extending surface of said first means faces in said one direction and said radially extending surface of said second means faces in said opposite direction.

4. The shaft seal set forth in claim 3 wherein said first means is an annular shoulder on the outer peripheral surface of said seal element and said second means is an annular groove in the inner peripheral surface of said housing chamber.

References Cited

UNITED STATES PATENTS

| 1,339,297 | 5/1920 | Spicer | 277—149 X |
| 2,914,348 | 11/1959 | Kroekel | 277—157 |

FOREIGN PATENTS

| 176,401 | 10/1953 | Austria. |
| 28,259 | 10/1924 | France. |
| 277,806 | 9/1927 | Great Britain. |
| 355,570 | 8/1931 | Great Britain. |
| 763,373 | 12/1956 | Great Britain. |

LAVERNE D. GEIGER, *Primary Examiner.*

J. S. MEDNICK, *Assistant Examiner.*